FIGURE II
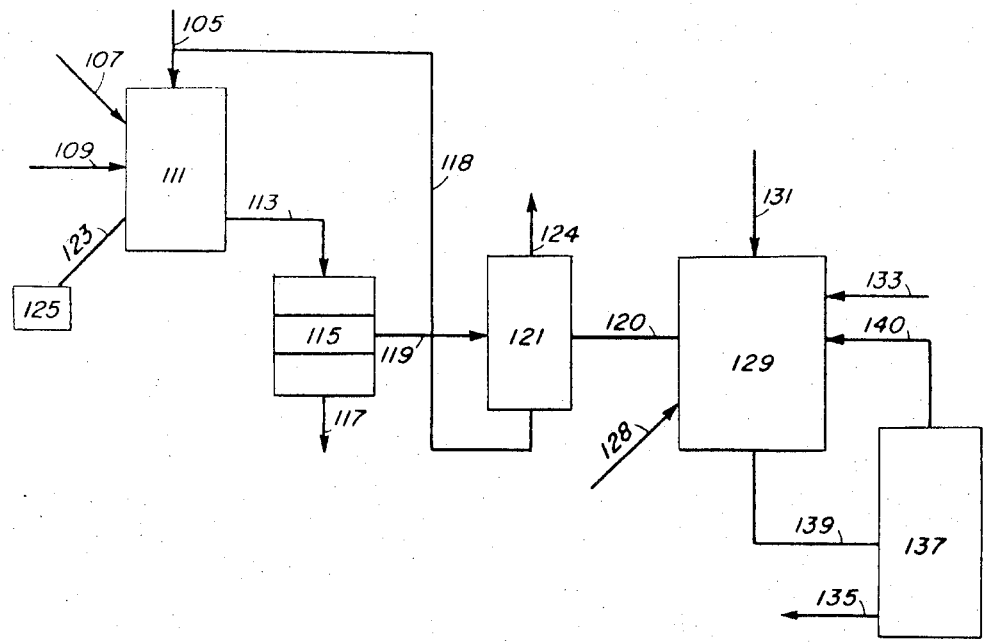
FIGURE III
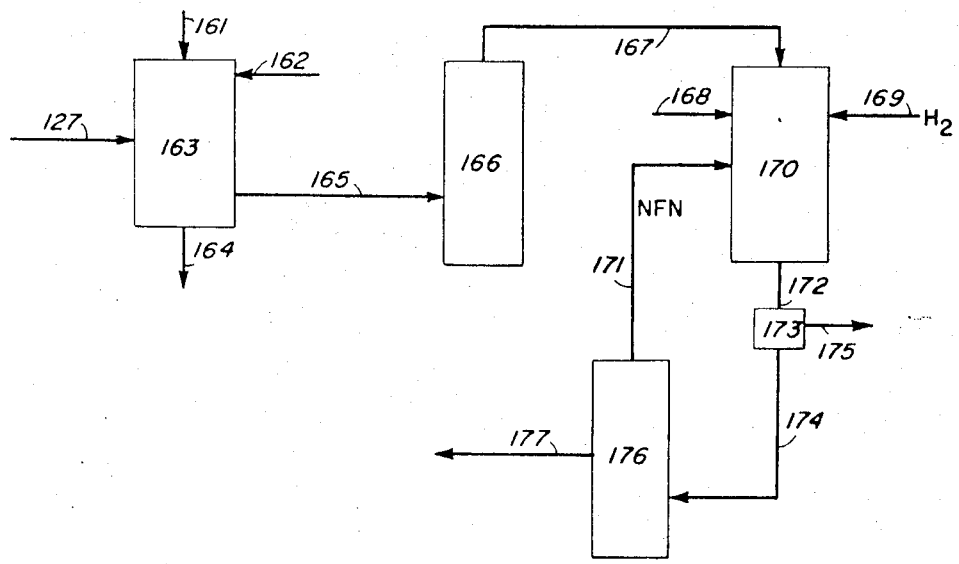

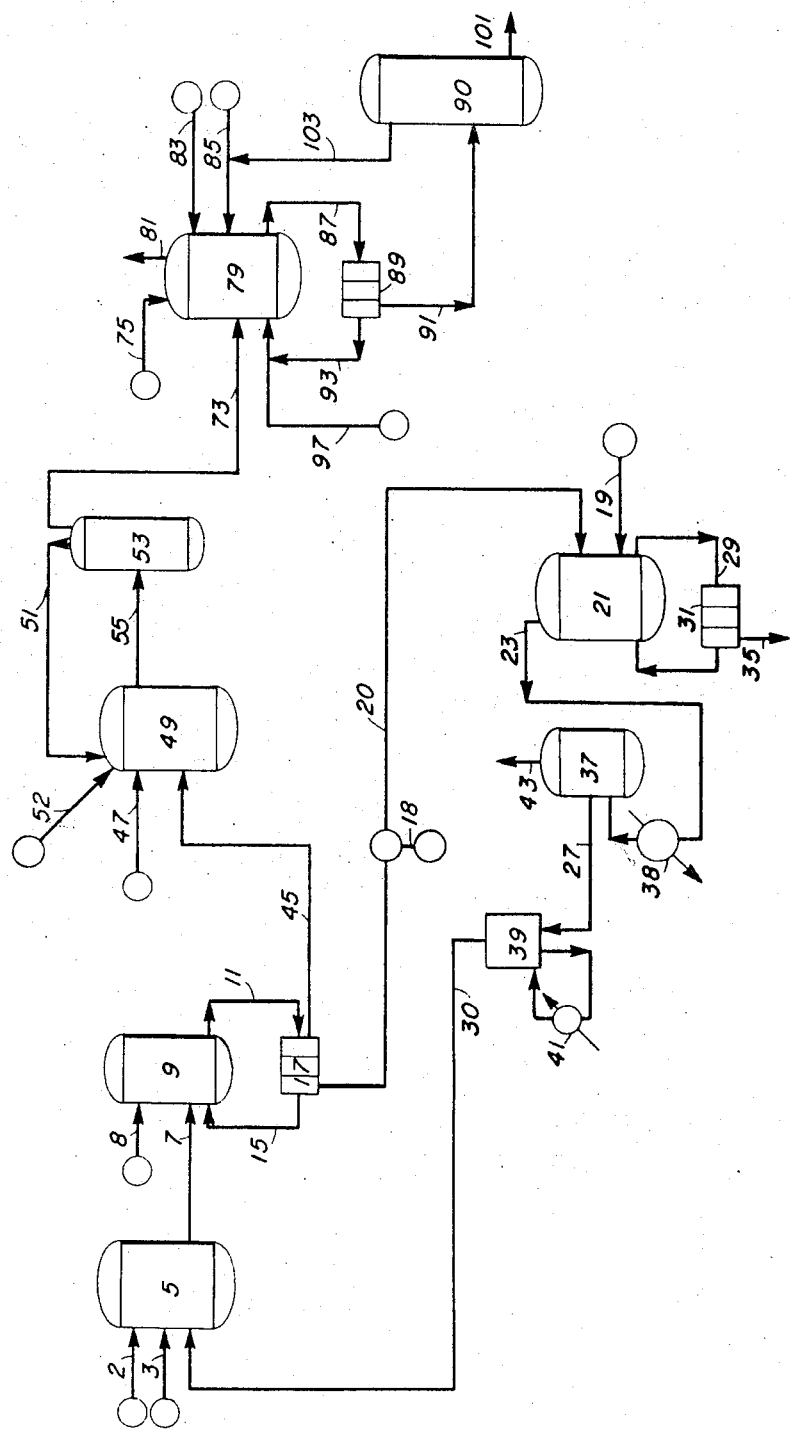
FIGURE I

United States Patent Office 3,847,984
Patented Nov. 12, 1974

3,847,984
PROCESS FOR THE PREPARATION OF CYCLOPROPYLMETHYL ALKYL AMINES
Jerome Linder and Lester L. Maravetz, Westfield, George N. Schmit, Scotch Plains, and Neil F. Newman, Matawan, N.J., assignors to Esso Research and Engineering Company
Original application Aug. 28, 1970, Ser. No. 67,809, now Patent No. 3,739,025. Divided and this application May 18, 1973, Ser. No. 361,728
Int. Cl. C07c 87/34
U.S. Cl. 260—563 R        6 Claims

ABSTRACT OF THE DISCLOSURE

This invention relates to a method for preparing cyclopropylmethyl alkyl amines and alkylcyclopropylmethyl alkyl amines. The method comprises the steps of reacting an allylic chloride with hydrogen bromide in the presence of a free radical catalyst to form the anti-Markownikoff product 1-bromo - 3 - chloropropane which can be optionally substituted with $C_1$–$C_4$ alkyl groups; contacting the reaction product of step (1) with a metal cyanide to form a gamma-chloronitrile; reacting the gamma chloronitrile with an alkali metal hydroxide to yield cyclopropyl cyanide or an alkylcyclopropyl cyanide; reacting the cyclopropyl cyanide or alkylcyclopropyl cyanide with an alkyl amine and hydrogen to yield a cyclopropylmethyl alkyl amine or an alkylcyclopropylmethyl alkyl amine.

In another aspect of this invention, the cyclopropyl or alkylcyclopropyl cyanide is reacted with hydrogen and the resulting cyclopropylmethyl amine or alkylcyclopropylmethyl amine is then reacted with either a ketone, aldehyde, or alcohol and hydrogen, or with an alkyl halide in the absence of hydrogen, to form either cyclopropylmethyl alkyl amines or $C_1$–$C_4$ alkylcyclopropylmethyl alkyl amines.

In still another variation of this invention, an N-alkylidene cyclopropylmethyl amine, or an N-alkylidene alkylcyclopropylmethyl amine, prepared by reacting a cyclopropylmethylamine or an alkylcyclopropylmethyl amine with an aldehyde or ketone, can be hydrogenated to form the cyclopropylmethyl alkyl amines or alkylcyclopropylmethyl alkyl amines.

The formation of cyclopropylmethyl alkyl amines and alkylcyclopropylmethyl alkyl amines without concurrent hydrogenolysis of the cyclopropane ring has proven to be quite unexpected and is the result of the careful conditions under which the cyclopropyl cyanide or alkylcyclopropyl cyanide is reacted with the various reactants stated hereinabove.

This is a division of application Ser. No. 67,809, filed on Aug. 28, 1970, now U.S. Pat. No. 3,739,025.

This invention relates to a method for preparing cyclopropylmethyl alkyl amines optionally substituted with $C_1$–$C_4$ alkyl groups on the cyclopropyl ring. In one aspect, this invention relates to reacting an optionally substituted cyclopropyl cyanide with hydrogen and an alkyl amine.

In another aspect, it relates to reacting an optionally substituted cyclopropylmethylamine with hydrogen and either a ketone, aldehyde, or alcohol, or with an alkyl halide in the absence of hydrogen.

In yet another aspect, this invention relates to reacting an optionally substituted N-alkylidene cyclopropylmethyl amine with hydrogen to form an (optionally substituted with $C_1$–$C_4$ alkyl groups) cyclopropylmethyl alkyl amine.

A pending U.S. patent application bearing Ser. No. 749,326 and filed on Aug. 1, 1968, now U.S. Pat. No. 3,546,295, described the preparation of cyclopropylmethyl alkyl amines by reducing the corresponding N-alkyl cyclopropanecarboxamides with various reducing agents such as metal hydrides.

Although this process is perfectly operable in the laboratory it proved to be not too feasible for large commercial operations because metal hydrides are considerably difficult to handle and, therefore, it was desired to find a method for the preparation of these compounds not requiring the use of metal hydrides.

The literature (K. Kindler and F. Hesse, Arch. Pharm., *271*, 439 (1933)), describes a reaction which could conceivably be used to synthesize cyclopropylmethyl alkyl amines, or alkylcyclopropylmethyl alkyl amines, namely the catalytic hydrogenation of a nitrile in the presence of a primary amine:

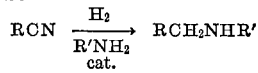

The problem with this reaction was that the cyclopropane ring would not survive under such hydrogenation conditions. The literature cites many cases where cyclopropyl derivatives can be converted to ring opened acyclic derivatives by catalytic hydrogenation (e.g. R. V. Volkenburgh, K. W. Greenlee, J. M. Derfer, and C. E. Boord, J. Am. Chem. Soc., *71*, 172 (1949); B. A. Kazanskii, M. Y. Lukina, and L. G. Salnikova, Dokl. Akad. Nauk S.S.S.R. *115*, 301 (1957); ibid.; Izv. Akad. Nauk S.S.S.R., Otdel. Khim. Nauk, 1401 (1957); G. C. Bond and J. Newham, Trans. Faraday Soc., *56*, 1501 (1960)).

Another potential route to (optionally substituted with $C_1$–$C_4$ alkyl groups) cyclopropylmethyl alkyl amines was to employ the process described in the literature involving the reductive alkylation of a primary amine with a carbonyl compound, W. S. Emerson, Org. Reactions, *4*, 174 (1948) or an alcohol (e.g., K. Smeykal, U.S. 2,043,- 965 (1936); R. G. Rice and E. J. Kohn, U.S. 2,813,124 (1957); R. E. Morris, U.S. 2,824,137 (1958); Gulf Research and Development Co., Brit. 1,077,949 (1967));

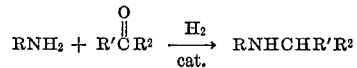

or

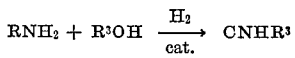

However, only a few examples were known of cyclopropane derivatives which would undergo such a reaction without accompanying hydrogenolysis of the cyclopropane ring.

Thus, M. Freifelder and B. W. Horrom, J. Pharm. Sci., *52*, 1191 (1963) describe the reductive alkylation of cyclopropylamine.

However, the prior art literature cited previously, indicates quite clearly that the cyclopropyl ring undergoes ring cleavage in many hydrogenation type reactions.

Therefore, an object of the present invention is to prepare (optionally substituted with $C_1$–$C_4$ alkyl groups) cyclopropylmethyl alkyl amines from suitable cyclopropane derivatives and hydrogen in the presence of a catalyst thereby avoiding the use of metal hydrides which are considerably more difficult to handle than hydrogen.

It is another object of this invention to prepare (optionally substituted with $C_1$–$C_4$ alkyl groups) cyclopropylmethyl alkyl amines by catalytic hydrogenation of an (optionally substituted with $C_1$–$C_4$ alkyl groups) cyclopropyl cyanide in the presence of an alkyl amine without the formation of significant amounts of ring-opened products.

Still another object of this invention is to produce (optionally substituted with $C_1$–$C_4$ alkyl groups) cyclopropylmethyl alkyl amines at high reaction rates and produce the product in high yields with high purity.

Further objects and advantages of this invention will become apparent to those skilled in the art from the following discussion, appending claims and accompanying drawings, wherein:

FIG. 1 is a schematic flow diagram depicting the complete process for producing (optionally substituted with $C_1$–$C_4$ alkyl groups) cyclopropylmethyl aklyl amines starting from the reaction of (optionally substituted with $C_1$–$C_4$ alkyl groups) allylic chlorides with hydrogen bromide over a free radical catalyst with the novel features of this invention illustratively associated therewith;

FIG. 2 is a schematic flow diagram depicting reacting cyclopropyl cyanide (optionally substituted with $C_1$–$C_4$ alkyl groups on the cyclopropyl ring) with hydrogen in the presence of a catalyst to form either cyclopropylmethyl amine or cyclopropylmethyl amine optionally substituted with $C_1$–$C_4$ alkyl groups on the cyclopropyl ring and reacting either the cyclopropylmethyl amine or the cyclopropylmethyl amine optionally substituted with $C_1$–$C_4$ alkyl groups on the cyclopropyl ring with hydrogen and either an aldehyde, ketone or alcohol, or with an alkyl halide in the absence of hydrogen;

FIG. 3 is an alternative method for preparing (optionally substituted with $C_1$–$C_4$ alkyl groups) cyclopropylmethyl alkyl amine.

With reference to the drawings and particularly, FIG. 1, the allylic chloride is passed via line 2 into reactor 5 and a free radical catalyst, such as benzoyl peroxide, is added via line 3 to the reactor 5. Hydrogen bromide is added to the reactor 5 via line 30.

In reactor 5, the allylic chloride reacts with the hydrogen bromide in the presence of the free radical initiator to yield the anti-Markownikoff addition product, an optionally substituted with $C_1$–$C_4$ alkyl group, 1-bromo-3-chloropropane. This reaction can be carried out at a temperature ranging from −80 to +200° C. and preferably from −10 to +70° C. The pressures under which this reaction can be carried out can range from 1 to 100 atmospheres and preferably from 1 to 10 atmospheres.

The free radical catalyst may be any one of those catalysts selected from the group consisting of ultraviolet light, ditertiary butyl peroxide, benzoyl peroxide, 2,4-dichlorobenzoyl peroxide, lauroyl peroxide, decanoyl peroxide, tertiary butyl hydroperoxide, tertiary butyl peroxybenzoate and azobisisobutyronitrile.

Alternatively, the natural peroxides which form in allyl chloride over long storage periods can serve as the initiator in this reaction.

In still another variation, the simultaneous addition of hydrogen bromide and bromine to a saturated solution of water in allyl chloride which had been saturated with pure oxygen results in high yields of the desired addition product. This reaction is described in detail in U.S. Pat. 2,412,882 issued in 1946.

Still another process for converting allyl chloride to 1-bromo-3-chloropropane comprises dissolving water into allyl chloride which has been aged not less than a week and treating this mixture with hydrogen bromide in the presence of a catalyst selected from the group consisting of the chlorides, bromides and iodides of the heavy metals of the Fifth Group of the Periodic System, for example, $BiCl_3$. A more detailed description of this process is described in U.S. Pat. 2,255,605 issued in 1941.

The (optionally substituted with $C_1$–$C_4$ alkyl groups) 1-bromo-3-chloropropane is passed via line 7 into reactor 9 to which is added a metal cyanide contained in an alcohol-water mixture. This metal cyanide-alcohol-water mixture is passed into reactor 9 via line 8.

The cation portion of the metal cyanide can be chosen from alkali or alkaline earth metals; the preferred cation is potassium or sodium, e.g. potassium cyanide or sodium cyanide.

The alcohol portion of the solvent can vary from $C_1$ to $C_5$ alkyl, but the preferable alcohols are methanol, ethanol or propanol.

The reaction temperature can vary from 25° C. to 150° C. at atmospheric pressure; however, the preferred temperature varies between 40° C. and 100° C.

The mole ratios of the reactants are extremely critical in this step in order to obtain maximum yield. It is important to use an excess of the (optionally substituted with $C_1$–$C_4$ alkyl groups) 1-bromo-3-chloropropane in order to avoid the formation of any undesirable (optionally substituted with $C_1$–$C_4$ alkyl groups) glutaronitrile, thus lowering the yield of the desired gamma-chloronitrile.

The mole ratios of the (optionally substituted with $C_1$–$C_4$ alkyl groups) 1-bromo-3-chloropropane to the metal cyanide can vary from 1:1 to 10:1, the preferable ratio being 1.25:1.

The reactants are mixed together in reactor 9 and heated to reflux for 3 hours. The resulting product, alcohol, water and the bulk of the unreacted alkyl (optionally substituted with $C_1$–$C_4$ alkyl groups) 1-bromo-3-chloropropane are removed via line 11 and distilled. The sodium chloride, sodium bromide, water and gamma-chloronitrile are passed through filter 17 whereby the sodium chloride, sodium bromide, saturated solutions and solids are passed via line 20 to reactor 21. The organic phase of the filtrate is fractionated (not shown), the overhead is recycled to reactor 9 via line 15 and the product is passed via line 45 to reactor 49.

Sodium bromide is added to line 20 via line 18 and concentrated sulfuric acid is added via line 19 to reactor 21 in order to regenerate the hydrogen bromide. This regeneration step is described in U.S. Pat. 2,705,670 and therefore does not form part of our inventive concept but is added in order to complete the disclosure herein. In general, hydrogen bromide gas is generated by the addition of concentrated sulfuric acid to a stirred slurry of sodium bromide and water. The ratio of water to total bromine present as alkali metal bromide and hydrogen bromide must be less than 1:1 and more than 1:15. The temperature can range between 100 and 130° C. Initially the actual liberation of hydrogen bromide from the reaction mixture is reduced somewhat by the adsorption of hydrogen bromide into the aqueous mixture as it is formed. Thereafter upon saturation of the mixture, yields of hydrogen bromide evolved are higher. After evolution of hydrogen bromide subsides, another quantity of sodium bromide is charged into the reactor and an equivalent of sulfuric acid added to continue the process. The by-product, sodium bisulfate, accumulates after a time and must be removed periodically in order to maintain a stirrable slurry.

The present system differs somewhat from the above process in that the sodium bromide recovered from reactor 9 is always contaminated with sodium chloride. Therefore, hydrogen chloride gas is liberated, as well as hydrogen bromide, upon addition of sulfuric acid. Since hydrogen chloride is useless to the process, it is disposed of at a later point. The sodium bisulfate is removed by passing the solution via line 29 through a filter 31 and by removing the sodium bisulfate via line 35. The filtrate is recycled via line 33 back into reactor 21. The mixture of hydrogen chloride and hydrogen bromide passes as overhead via line 23 through cooler 38 where the temperature of the mixture is reduced so as to condense both the hydrogen chloride and hydrogen bromide. Any suitable cooling medium such as ammonia can be employed in cooler 38. The condensed hydrogen chloride and hydrogen bromide are passed via line 37 to column 25 for fractionation into hydrogen chloride and hydrogen bromide.

Hydrogen chloride passes via line 43 from the top of column 25 and hydrogen bromide is removed via line 27 into vaporizer 39 which is heat exchanged with steam passing via line 41. The liquid is vaporized into gaseous hydrogen bromide and passed via line 30 back into reactor 5. The nitrile is heated in reactor 49 between a temperature ranging from 50 to 200° C. and preferably from 110 to 130° C. Small increments of an alkali hydroxide are passed into the reactor via line 47 at a rate sufficient to maintain a molar ratio of hydroxide to nitrile in a range from 0.25:1 to 1.5:1; the preferable ratio being 0.75:1. An exothermic reaction occurs, and some of the product distills out of the reactor along with the by-product water through line 55 into tower 53.

When all the alkali hydroxide has been added, vacuum is applied to the reactor and the temperature raised to between 125 and 150° C. to remove more of the remaining product, as well as, starting materials. The reactor is then cooled to a temperature ranging from 25 to 50° C. and water saturated with alkali chloride is added via line 52 into reactor 49.

Two layers form, one being the organic phase which is combined with the distilled material and the other being water, which is removed.

The organic portion of the reaction is then fractionated in tower 53 to remove the (optionally substituted with $C_1$–$C_4$ alkyl groups) cyclopropyl cyanide from any impurities as well as the starting $\gamma$-chloronitrile which is recycled into reactor 49.

The (optionally substituted with $C_1$–$C_4$ alkyl groups) cyclopropyl cyanide is removed from the top of tower 53 via line 73 to reactor 79. An alkyl amine is introduced via line 75 and a catalyst is introduced via line 97 into reactor 79.

Hydrogen is introduced into the reactor via line 83 from a suitable source and a solvent is introduced via line 85 into reactor 79.

The desired reaction is selectively achieved without substantially simultaneously hydrogenating the cyclopropyl ring or causing hydrogenolysis of the ring itself.

The catalyst employed in this addition reaction carried out in reactor 79 can be any metal hydrogenation catalyst or compound thereof known in the art. The metal used can be any of the heavy metals, i.e. those having an atomic weight of 22 or higher. A preferred class of metals consists of rhodium and platinum. They can be employed in the form of their oxides but the free metals in finely divided form can be employed or other compounds thereof, such as sulfides, sulfites, phosphites or phosphates. The materials can be employed singly or in admixture one with another, or they can be deposited on a carrier, such as carbon, alumina, silica gel, barium sulfate, calcium carbonate, barium carbonate, kieselguhr, zirconia, thoria, magnesia, titania, montmorillonite clay, bauxite, diatomaceous earth, coarse porcelain or any other refractive material which has no adverse effect on the reaction. The preferred catalyst employed in this particular step of the process is rhodium supported on carbon.

The catalyst is loaded into the reactor in the form of a slurry in a solvent or fixed bed. When a slurry is used, the reaction time varies with the catalyst used, usually being about 1 to 100 hrs.; temperatures of about 0° up to the boiling point of the reaction mixture at the operating pressure may be used, preferably 25 to 100° C.; pressures of 1 to 300 atmospheres may be employed, preferably 1 to 100 atmospheres; any inert solvent in which the starting materials are soluble may be employed, preferably alcohols, ethers, organic acids, glycols, water, and paraffinic and aromatic hydrocarbons. In operation, the reaction may also be carried out in the absence of solvents. The amine is preferably, but not necessarily added in excess over the nitrile, usually about 1 to 1000 mole percent excess.

The nitrile and amine starting materials may be added to the catalyst at the start of the reaction or either the nitrile or the amine may be added either continuously or intermittently during the course of the reaction. The catalyst contains from 0.001 to 100% of metal component, preferably 0.1 to 100%. The weight of catalyst employed including the support if any, is usually about 0.001 to 100% of the weight of the nitrile, preferably 0.01 to 10%.

When a fixed bed catalyst is employed the space velocity, temperature and so on vary with the catalyst employed. The volume hourly space velocity ranges from 20 to 200,000. preferably 200 to 20,000 and the temperature depends partly on whether it is desired to carry out the reaction in liquid phase or in vapor phase, and ranges from 0 to 1000°, preferably from 100 to 500° C. Pressures of 1 to 300 atmospheres may be employed, preferably 1 to 10 atmospheres. In the fixed bed catalyst system usually no solvent is employed; however, any inert solvent in which the starting materials are soluble may be used, including alcohols, ethers, organic acids, glycols, paraffinic and aromatic hydrocarbons. Either starting material, i.e., nitrile or amine, may be added in excess, usually about 1–1000 mole percent excess. If desired, an inert gaseous diluent such as nitrogen may be added. Hydrogen is added at the rate of about 0.1–1000 moles per mole of nitrile, preferably 1–100 moles per mole of nitrile and the catalyst may contain from 0.001 to 100% of metal component, preferably 0.1–100%. The weight of catalyst used depends on the desired space velocity, temperature, mole ratio of reactants and other parameters.

The products of this reaction are removed from the bottom of the reactor 79, via line 87, passed through filter 89 with liquid product removed via line 91 and the catalyst solids in the slurry are recycled via line 93 back into reactor 79 after they have passed through a catalyst regeneration step (not shown).

Liquid products are passed into tower 90 where the solvent is flashed therefrom and returned via line 103 into line 85. The products are removed from the bottom of tower 90 via line 101 and sent to product recovery (not shown).

With reference to FIG. 2, there is described another method of reacting the (optionally substituted with $C_1$–$C_4$ alkyl groups) cyclopropyl cyanide so as to form an (optionally substituted with $C_1$–$C_4$ alkyl group) cyclopropylmethyl alkyl amine. In this reaction, the (optionally substituted with $C_1$–$C_4$ alkyl groups) cyclopropyl cyanide is reacted with hydrogen in the absence of the amine and the resulting (optionally substituted with $C_1$–$C_4$ alkyl groups) cyclopropylmethyl amine is then reacted with hydrogen and an aldehyde, ketone, or alcohol according to the following equations:

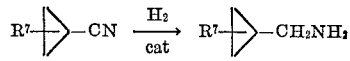

where

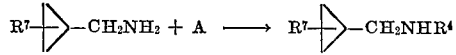

or $R^4OH$, such that $R^4=R^5CHR^6$; $R^4$ is a $C_1$–$C_4$ alkyl and $R^5$, $R^6$ and $R^7$ are hydrogen or $C_1$–$C_4$ alkyl.

In an alternative manner, an alkyl halide, such as propyl bromide can be employed in the reaction with (the optionally substituted with $C_1$–$C_4$ alkyl groups) cyclopropylmethyl amine. When the halide is employed, it is not necessary that hydrogen and a catalyst be present.

The hydrogen is introduced via line 107 into reactor 111 and an (optionally substituted with $C_1$–$C_4$ alkyl group) cyclopropyl cyanide is introduced via line 109 into reactor 111. The catalyst, preferably Raney nickel or nickel on kieselguhr, is introduced from a catalyst mix tank 125 via line 123 into reactor 111. A solvent or ammonia may be introduced via line 105 into the top of the reactor and the product (optionally substituted with $C_1$–$C_4$ alkyl groups) cyclopropylmethyl amine is removed via line 113 which is then passed through filter 115 wherein inert solids are removed via line 117. The filtrate containing the (optionally substituted with $C_1$–$C_4$ alkyl groups) cyclopropylmethyl amine solution passes via line 119 into a fractionator 121 wherein ammonia is removed via line 124 and the (optionally substituted with $C_1$–$C_4$ alkyl groups) cyclopropylmethyl amine is removed via line 120 and is passed into reactor 129. The solvent, if any is used, is removed via line 118 and recycled back to line 105.

The catalyst and any other solids are removed from filter 115 via line 117 and sent to a catalyst regeneration system not shown.

Any suitable aldehyde, ketone, alcohol, or in the alternative, an alkyl halide is added to reactor 129 via line 131. Additional hydrogen is introduced into reactor 129 via line 133. When an alkyl halide is employed it is not necessary to introduce additional hydrogen into the reactor 129. A catalyst may be added via line 128 from a source not shown. Solvent, if any, is introduced via line 128. The liquid products are removed via line 139 into tower 137 where the (optionally substituted with $C_1$–$C_4$ alkyl groups) cyclopropylmethyl alkyl amine is removed via line 135 and the aldehyde, ketone, alcohol or alkyl halide and solvent is recycled via line 140 back into reactor 129.

The catalyst for this reaction is selected from the same group as described hereinabove but is preferably rhodium on carbon, platinum on carbon, palladium on carbon, copper on siliceous support, copper on alumina, or unsupported copper chromite which may contain 1 to 50% barium chromite.

The weight and composition of the catalyst employed and the various reaction conditions are the same for this step of the reaction as were described previously in FIG. 1 for reacting the (optionally substituted with $C_1$–$C_4$ alkyl groups) cyclopropyl cyanide with the alkylamine. It is to be understood that in this reaction, an aldehyde, ketone, alcohol or halide are employed in lieu of the nitrile.

FIG. 3 describes still another embodiment for carrying out the process of the subject invention. With reference to FIG. 3, reactor 163 is charged with the (optionally substituted with $C_1$–$C_4$ alkyl groups) cyclopropylmethyl amine prepared in reactor 111 in FIG. 2. An alkali or alkaline earth metal hydroxide which is preferably an alkali metal hydroxide such as either potassium hydroxide or sodium hydroxide, is passed via line 162 into reactor 163 and an aldehyde or ketone is added via line 161 to reactor 163. The mixture is stirred in reactor 163 so as to form an aqueous alkali metal hydroxide layer which is removed and discarded via line 164. The organic layer is then passed through line 165 into tower 166 where it is fractionated to give pure (optionally substituted with $C_1$–$C_4$ alkyl groups) N-alkylidene cyclopropylmethyl amine and is passed via line 167 into reactor 170. Reactor 170 is charged with a catalyst selected from the same group as described hereinabove, but is preferably rhodium supported on carbon, copper on a siliceous support, copper on alumina, or platinum on calcium carbonate via line 168 and hydrogen gas passed into the reactor via line 169. A solvent may be added via line 171. The weight and composition of the catalyst employed and the various reaction conditions are the same for this step of the reaction as were described previously in FIG. 1 for reacting the (optionally substituted with $C_1$–$C_4$ alkyl groups) cyclopropyl cyanide with the alkylamine. The weight of catalyst is based upon the weight of amine. The mixture is then passed from reactor 170 via line 172 where it is passed through filter 173 in which spent catalyst is removed via line 175. The clarified reaction mixture is then passed through line 174 to fractionator tower 176 in which solvent is recovered for recycling to reactor 170 via line 171 and (optionally substituted with $C_1$–$C_4$ alkyl groups) cyclopropylmethyl alkyl amine product is removed via line 177.

The following examples further illustrate the objects and advantages of this invention but it should be understood that the various reactants, amounts, temperatures, pressures and other conditions recited in these examples should not be construed so as to unduly limit this invention.

Example 1.—A Continuous Operation for the Preparation of Cyclopropylmethyl Propyl Amine With reference to FIG. 1, 2295 grams (30 moles) of allyl chloride is passed via line 2 into reactor 5 and benzoyl peroxide (60 grams, 2.6 weight percent on allyl chloride charged) is added via line 3 into the reactor. The resulting solution is cooled with stirring to around 4° C. Hydrogen bromide gas (2430 grams, 30 moles, plus approximately 160 g. excess) is introduced via line 30 at such a rate, with continued cooling that the reaction temperature does not exceed about 40° C. After the theoretical quantity of hydrogen bromide is added, the temperature drops to about 10° C. Stirring is continued without further cooling until room temperature is attained. The crude reaction mixture is washed directly with 750 ml. of saturated $NaHCO_3$ solution twice, and then twice with 750 ml. of water. The organic layer is dried over $CaCl_2$, filtered and distilled to yield 4200 grams (26.6 moles) of 1-bromo-3-chloropropane (89% yield), main boiling range 140–42° C. About 240 g. of the reverse isomer, 1-chloro-2-bromopropane, distills as a forerunner to the desired isomer.

The hydrogen bromide used for reaction with allyl chloride in the previously described step is generated by action of sulfuric acid on sodium bromide which is recovered from reactor 9. The sodium bromide is contaminated with some sodium chloride formed as a by-product. Additional sodium bromide may be added as makeup through line 18 into line 20.

In a typical run, a mixture of salts (2060 grams, 20 moles of NaBr and 378 grams, 6.46 moles of NaCl) is fed via line 20 into reactor 21, along with water (753 grams). One half equivalent of 96% sulfuric acid (1350 grams, 13.23 moles) is added slowly with stirring through line 19. The resulting stirred slurry is heated to about 125° C. and an additional 1350 grams of 96% sulfuric acid is added slowly to the reactor. HBr gas and HCl gas are liberated and pass via line 23 to column 25. Most of the product gases are evolved during the first three hours of reaction. Final yields are on the order of 68% HBr and 95% HCl for the initial charge.

To the same reaction mixture is added more of the salt mixture, e.g. NaBr (1030 grams, 10 moles) and NaCl (189 grams, 3.23 moles), but no water is added. To this stirred hot slurry, is added slowly 96% sulfuric acid (1350 grams, 13.23 moles). After several hours of reaction, an 82% yield of HBr and 82% yield of HCl is evolved. On the basis of *total* charge (20 moles of NaBr and 9.7 moles of NaCl) the yield of HBr is 73% and of HCl is 90%.

The above addition procedure is repeated twice more for a total charge of 50 moles of NaBr and 16.15 moles of NaCl. The final total yield of HBr is about 83% and of HCl is 90%.

At this point in the generation procedure, the slurry in the reactor is quite thick due to the buildup of the by-product salt $NaHSO_4$. It is advantageous to pass the slurry via line 29 through filter 31, and thus remove the $NaHSO_4$ through line 35. The mother liquors are charged back into the reactor via line 33.

The product gases are fractionated in column 25 with HCl exiting through line 43 and the desired HBr passing through line 27 into vaporizer 39. The HBr is vaporized via steam heat and passes through line 30 into reactor 5 as required for reaction with allyl chloride.

To reactor 9 is added 4200 grams of 1-bromo-3-chloropropane (26.6 moles) via line 7. 865 grams of NaCN (17.7 moles), 1770 ml. of water and 6200 ml. of ethanol are added via line 8. The contents are heated slowly to about 40–50° C. At this temperature an exothermic reaction results so that refluxing takes place. When the exotherm subsides (about 15 minutes) refluxing is continued for another thirty minutes. The contents are now distilled at a reactor temperature of about 70° C. at 20 mm. pressure until the distillate becomes heterogeneous. This removes water, ethanol, most of the unreacted 1-bromo-3-chloropropane, and some of the desired gamma chlorobutyronitrile. These are removed via line 11, and recycled via line 15 into reactor 9 for further reaction with more 1-bromo-3-chloropropane and sodium cyanide. The residue from the distillation is filtered through filter 17 to remove NaCl and NaBr leaving an oil and a saturated brine solution. The oil is separated off and fractionated under a vacuum (85° C., 20 mm. pressure) resulting in 1450 grams of the desired product containing about 90% ClCH$_2$CH$_2$CH$_2$CN and 10% BrCH$_2$CH$_2$CH$_2$CN. Yield is 77% based on Cl(CH$_2$)$_3$Br consumed, but not including the Cl(CH$_2$)$_3$CN and Br(CH$_2$)$_3$CN returned to recycle I. The brine solution is combined with the filtered salts and placed into reactor 21 for HBr regeneration. The salt brine solution contains 17.7 moles of a mixture of about 75–80% NaBr and 20–25% NaCl.

The contents from the distillation and fractionation contain 1310 grams of ClCH$_2$CH$_2$CH$_2$Br, 153 grams of ClCH$_2$CH$_2$CH$_2$CN and 59 grams of BrCH$_2$CH$_2$CH$_2$CN, as well as ethanol and water.

Recycle I.—The distillate in line 15 is combined in reactor 9 with 2780 grams (17.7 moles), ClCH$_2$CH$_2$CH$_2$Br, 865 grams (17.7 moles) of NaCN and 860 cc. of water and reacted in a similar manner as described hereinabove. Yield 1600 grams (85%).

Recycle II.—Distillate from Recycle I plus 17.7 moles of NaCN, 17.7 moles of ClCH$_2$CH$_2$CH$_2$Br and 860 ml. of water is again reacted in recator 9 in a similar manner as described hereinabove. Yield 1600 grams (85% based on the amount of 1-bromo-3-chloropropane consumed). 1600 grams of gamma-chlorobutyronitrile (14.5 moles) is passed via line 45 into reactor 49. Via line 47 is added 193 grams of potassium hydroxide pellets. This mixture is heated to 100–110° C.; at this temperature the reaction is exothermic and cyclopropyl cyanide and water distill off via line 55 into fractionator 53. Another 350 grams of KOH is added continuously to reactor 49 at a reaction temperature of 130–160° C. A total of 9.7 moles of 85% KOH is consumed. The reaction temperature is maintained at 150° C. to distill off the remaining cyclopropyl cyanide. The residue is dissolved in water and saturated with sodium chloride. The organic phase is separated off and combined with the organic phase from the distillation in fractionator 53. This is fractionated at 85–95° C. at 150 mm. pressure resulting in 481 grams of 98% cyclopropyl cyanide. Yield based on consumption of gamma-chlorobutyronitrile is 71%. A further fractionation cut of ClCH$_2$CH$_2$CH$_2$CN (461 grams) at 100–105° C. at 30 mm. pressure is removed for recycle into reactor 49.

Reactor 79 is charged with 35.8 grams of 5% rhodium/charcoal catalyst (0.38 weight percent, rhodium metal based on weight of nitrile) via line 97, 481 grams (7.03 moles) of 98% cyclopropyl cyanide via line 73, 1695 grams (28.7 moles) of propylamine via line 75, and 720 ml. of methanol via line 85. The addition of methanol causes a slight exotherm to about 35–40° C. Reactor 79 is sealed and hydrogen gas is introduced via line 83. A hydrogen gas pressure of 50 p.s.i. is maintained over the stirred mixture at ambient temperature and after about 14 hours approximately 97% of the theoretical quantity of hydrogen is consumed. The reactor is depressurized, the product mixture passed through filter 89 via line 87, and the solid catalyst after regeneration is recycled via line 93 into reactor 79. The filtrate passes via line 91 into tower 90 for recovery of solvent and unreacted propylamine through distillation. Both the methanol and propylamine distill as the temperature is increased to a maximum of 127° C. These components are recycled via line 103 back to reactor 79. The liquid residue weighs 618 grams and by gas chromatographic analysis is found to contain 550 grams (4.86 moles) of cyclopropylmethyl propyl amine. This represents a 69% yield of the desired product. The amine may be purified further by distillation. (B.p. about 135–39° C.).

In an alternate procedure, reactor 79 is charged with 35.8 grams of 5% rhodium/charcoal catalyst via line 97, 424 grams (7.17 moles) of propylamine via line 75 and 720 ml. of methanol via line 85. Hydrogen gas is pressured into the reactor at 50 p.s.i. via line 83 and as the entire mixture is stirred at ambient temperature, 98% cyclopropyl cyanide (481 grams, 7.03 moles) is added over a period of 1½ hours utilizing a feed pump which is capable of operating against 50 p.s.i. Immediately thereafter, additional propylamine (212 grams, 3.58 moles) is added. At this point, 55% of the theoretical hydrogen is absorbed. Hydrogenation is continued to completion (about 5 hours).

The reaction mixture is passed through filter 89 and the product distilled in tower 90. The forerun consisting of methanol and propylamine is recycled into reactor 79 and the residue is distilled to give 447 grams of cyclopropylmethylpropyl amine (56% yield). The amine boils at about 135–39° C.

Example 2.—Alternate Preparation of Cyclopropylmethyl Propyl Amine According to FIG. 2

Reactor 111 is charged with 29.5 g. of 50% aqueous suspension of Raney nickel (W. R. Grace Co., No. 28) via line 123, 481 g. of 98% pure cyclopropyl cyanide (7.03 moles; from tower 53 via line 109), and 1650 ml. of ethylene glycol saturated with ammonia (via line 105). The reaction mixture is hydrogenated at 50° for 16 hrs. under 1000 p.s.i.g. hydrogen pressure (introduced via line 107). The reaction mixture is passed via line 113 to filter 115, where the spent catalyst is removed via line 117 and the filtrate is passed via line 119 to tower 121. In tower 121 the mixture is fractioned. Ammonia is distilled off via line 124; cyclopropylmethylamine (370 g., 5.20 moles, 74% yield, b.p. 26–35° at 50–80 mm.) is passed via line 120 to reactor 129; ethylene glycol is recycled via line 118 back into reactor 111.

In reactor 129, cyclopropylmethylamine (370 grams, 5.20 moles), propionaldehyde (301 grams, 5.20 moles), and hydrogen (48.6 grams, 24.3 moles), introduced via lines 120, 131 and 133, respectively, are passed at 150° over a fixed bed of 30% copper oxide on a siliceous support (which was previously reduced with hydrogen at 120–200°) at such a rate that a volume hourly space velocity of 2000 is achieved. The effluent is passed via line 139 to tower 137, where it is fractionated. Cyclopropylmethyl propyl amine (206 grams, 1.82 moles, 35% yield), b.p. 54° at 98 mm., is obtained and is removed via line 135.

Example 3.—Alternate Preparation of Cyclopropylmethyl Propyl Amine According to FIG. 3

Reactor 163 is charged with 370 grams (5.20 moles) of cyclopropylmethylamine (prepared in working example 2, FIG. 2), 302 grams (5.20 moles) of propionaldehyde and 80 grams (1.4 moles) of potassium hydroxide. The mixture is stirred at 0°–25° for one hour and the aqueous potassium hydroxide layer is removed and discarded. The organic layer is passed through line 165 into tower 166 where it is fractionated to give 466 grams (4.2 mole, 81%) of pure N-propylidenecyclopropylmethyl amine boiling at 55–60°/43 mm. Hg. This amine is passed via line 167 into reactor 170. Reactor 170 is simultaneously charged with 5.0 grams of 5% rhodium/carbon, 1700 ml. of methanol, and hydrogen gas to a pressure of 50 p.s.i.g. at the operating temperature of 70°. The mixture is agitated in reactor 170 for 2 hours, then passed via line 172 to filter 173 in which spent catalyst is removed. The clear reaction mixture is passed through line 174 to fractionation tower 176 in which the methanol is recovered for recycling to reactor 170 and 330 g. (2.9 mole, 70%) of cyclopropylmethyl propyl amine, b.p. 54° at 98 mm. Hg is obtained and removed via line 177.

Example 4

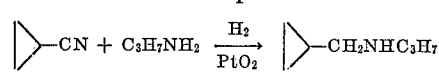

A mixture of 4 grams platinum oxide, 840 ml. methanol, 472 grams (8.00 moles) of propylamine, and 134 grams (2.00 moles) of cyclopropyl cyanide was hydrogenated for 16 hrs. at 70° under 50 p.s.i.g. hydrogen pressure in a rocker-type 3-liter stainless steel autoclave (after 4 hrs. the reaction was virtually complete). The supernatant solution was decanted from the catalyst and the volatiles removed by distillation through a 1-ft. glass-bead-packed column up to a maximum pot temperature of 125° (maximum temperature at the distilling head was 66°). The residue was then filtered to remove 8.4 grams of a white solid, which was identified by mixed mp as cyclopropylmethyl propyl amine hydrochloride. The liquid portion of the residue (164.9 g.) analyzed by glc (4 ft. x ¼ in. 10% silicone gum rubber UC–W98 on 60–80 mesh diatoport S; column temperature 100°) for 86.7% cyclopropylmethyl propyl amine (63.3% yield) and 8.0% butyl propyl amine (6.0% yield). Distillation of a portion of this product through a 6-inch Vigreaux column gave a 77% recovery of cyclopropylmethyl propylamine, b.p. 139–140°.

Example 5

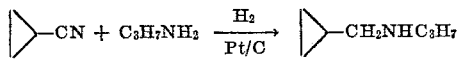

A mixture of 2.5 grams of 5% platinum on charcoal, 100 ml. of methanol, 17 grams (0.25 mole) of cyclopropyl cyanide, and 59 grams (1.00 mole) of propylamine was hydrogenated for five hours at 63–70° under 42–55 p.s.i.g. hydrogen pressure in a 500 ml. Parr hydrogenation apparatus (after 3½ hours the reaction was virtually complete). The catalyst was then filtered and the volatiles were removed from the filtrate by distillation through a 1 foot glass-bead-packed column up to a maximum pot temperature of 130°. The residue was filtered to remove a small amount of solids (<0.5 g.). The liquid portion of the residue (22.4 g.) was analyzed by glc to contain 17.6 g. (62% yield) of cyclopropylmethyl propyl amine and 1.6 g. (6% yield) of butyl propyl amine.

Example 6

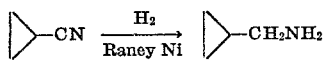

A mixture of 40 g. of Raney nickel (W. R. Grace Co. No. 28; aqueous suspension), 200 g. (2.88 moles) of cyclopropyl cyanide, and 1600 ml. of methanol saturated with ammonia was hydrogenated for 16 hrs. at 50° under 1000 p.s.i.g. hydrogen pressure in a rocker-type 3-liter stainless steel autoclave (the reaction was about 80% complete after 6 hrs.). The cvatalyst was filtered off and the volatiles (ammonia and some of the methanol) were removed from the filtrate by distillation through a 1-ft. glass-bead-packed column up to a maximum pot temperature of 80°. The residue (902 g.) contained 22.7% cyclopropylmethylamine (96% yield) by titration with HCl. The amine in methanol solution was acidified with 250 ml. of conc. HCl, while the temperature was kept below 30°. The solvent was removed in vacuum to give 339 grams of the crude hydrochloride salt. This residue was dissolved in 500 ml. of water, made alkaline by adding 400 g. of 50% NaOH while keeping the temperature below 30°, and extracted 4 times with 500 ml. of ether. The ether was dried over $Na_2SO_4$ and the solvent was distilled off to give a residue (221.4 g.) of cyclopropylmethylamine, which was 75.0% pure by titration with HCl. Yield 78%.

Example 7

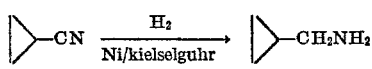

A mixture of 5 g. of 58% nickel on kieselguhr (Harshaw Ni-0104P), 34 g. (0.50 mole) of cyclopropyl cyanide, and 100 ml. of methanol was hydrogenated for 7 hours at 60–80° under 51–53 p.s.i.g. hydrogen pressure in a 500 ml. Parr hydrogenation apparatus. The catalyst was then filtered off to give 113.3 g. of filtrate, which contained 25.9% cyclopropylmethylamine (83% yield) by glc.

Example 8

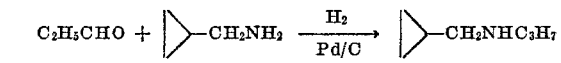

To a cold (~0°) solution of 26.3 g. (0.37 mole) of cyclopropylmethylamine in ~200 ml. of methanol, 21.5 g. (0.37 mole) of propionaldehyde and 2 g. of 5% palladium on charcoal were added. The mixture was hydrogenated for 20 hrs. at room temperature under 43 p.s.i.g. hydrogen pressure in a 500 ml. Parr hydrogenation apparatus (about 2 hrs. is sufficient time for reaction). The catalyst was filtered off and the filtrate distilled through a 1 ft. glass-bead-packed column to give 12.5 g. (30% yield) of cyclopropylmethyl propyl amine, b.p.$_{70}$ 68–69°.

Example 9

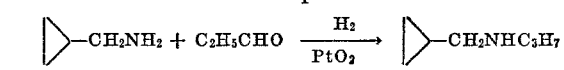

To a cold (~0°) solution of 14.2 g. (0.20 mole) of cyclopropylmethylamine in a ~80 ml. of methanol, 11.6 g. (0.20 mole) of propionaldehyde and 1.4 g. of platinum oxide were added. The mixture was hydrogenated at room temperature for 2½ hours under 38–53 p.s.i.g. hydrogen pressure in a 500 ml. Parr hydrogenation apparatus (after 15 minutes the reaction was virtually complete). The catalyst was filtered off and the filtrate was analyzed by glc to contain 18.4 g. (82% yield) cyclopropylmethyl propyl amine and practically no butyl propyl amine. The volatiles were then removed by distillation through a 1 ft. glass-bead-packed column (maximum pot temperature 130°) to give 16.3 g. (72% yield) of cyclopropylmethyl propyl amine.

Example 10

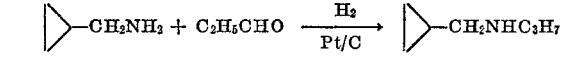

To a cold (~0°) solution of 14.2 g. (0.20 mole) ot cyclopropylmethylamine in ~80 ml. of methanol, 11.6 g. (0.20 mole) of propionaldehyde and 3 g. of 5% platinum on charcoal were added. The mixture was hydrogenated for 1½ hrs. at room temperature under 40–54 p.s.i.g. hydrogen pressure in a 500 ml. Parr hydrogenation apparatus (after 12 min. the reaction was virtually complete). The catalyst was filtered off and the filtrate was analyzed by glc to contain 14.4 g. (64% yield) of cyclopropylmethylpropyl amine and practically no butyl propyl amine. The volatiles were then removed by distillation through a 1 ft. glass-bead-packed column (maximum pot temperature 130°) to give 12.0 g. (54% yield) of cyclopropylmethyl propyl amine.

Example 11

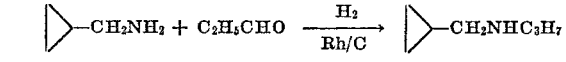

To a cold (~0°) solution of 14.2 g. (0.20 mole) of cyclopropylmethylamine in ~40 ml. of methanol, 11.6 g. (0.20 mole) of propionaldehyde and 3 g. of 5% rhodium on charcoal were added. The mixture was hydrogenated for 4 hrs. at room temperature under 39–50 p.s.i.g. hydrogen pressure in a 500 ml. Parr hydrogenation apparatus. The catalyst was filtered off and the filtrate was analyzed by glc to contain 10.5 g. (47% yield) of cyclopropylmethyl propyl amine.

Example 12

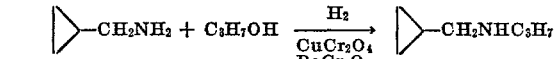

A mixture of 11.2 g. (0.16 mole) of cyclopropylmethyl amine, 9.6 g. (0.16 mole) of propanol, and 5 g. of a catalyst containing 90 mole percent copper chromite and 10 mole percent barium chromite was hydrogenated for 4 hrs. at 200° under 1000 p.s.i.g. hydrogen pressure in a rocker-type 300 ml. stainless steel autoclave. The catalyst was filtered and the filtrate was analyzed by glc to give a 43% yield of cyclopropylmethyl propyl amine.

Example 13

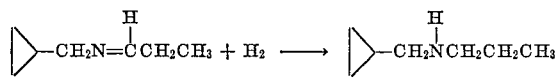

N-propylidene cyclopropylmethylamine (27.8 g., 0.25 mole) was dissolved in 150 ml. of methanol containing 3.0 g. of pre-reduced (with hydrogen gas at 170°), pulverized, copper oxide (30% on a siliceous support). It was then hydrogenated on a Parr shaker for 7 hours at 80° and an initial pressure of 50 p.s.i.g. Glc analysis of the product shows 13.7 g. (49%) of cyclopropylmethyl propyl amine.

Example 14

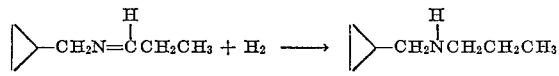

N-propylidene cyclopropylmethylamine (27.8 g., 0.25 mole) was dissolved in 150 ml. of methanol containing 64.0 g. of freshly prepared (from $CuO+H_2$) copper powder. It was then hydrogenated on a Parr shaker for 9 hours at 80° and an initial pressure of 50 p.s.i.g. Glpc analysis of the product shows 14.5 g. (51%) of cyclopropylmethyl propyl amine.

Example 15

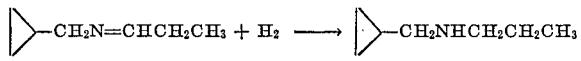

N-Propylidene cyclopropylmethylamine (22.2 g., 0.20 mole) was dissolved in 80 ml. of methanol. To this solution was added 450 mg. of 5% platinium on calcium carbonate catalyst and the entire mixture was hydrogenated at room temperature for 20 hours. Glpc analysis of the product mixture indicated 79.5% yield of cyclopropylmethyl propyl amine.

Example 16

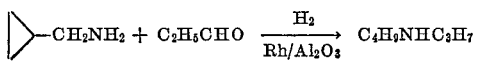

To a cold (~0°) solution of 14.2 g. (0.20 mole) of cyclopropylmethylamine in ~80 ml. of methanol, 11.6 g. (0.20 mole) of propionaldehyde and 3 g. of 5% rhodium on alumina were added. The mixture was hydrogenated for 16 hrs. at room temperature under 34–49 p.s.i.g. hydrogen pressure in a 500 ml. Parr hydrogenation apparatus (after 1 hr. the reaction was virtually complete). The catalyst was filtered off and the filtrate was analyzed by glc to contain butyl propyl amine as the major product.

Example 17

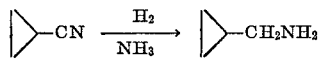

A mixture of 8.4 g. of Raney nickel (W. R. Grace No. 28; aqueous suspension), 67 g. (1.00 mole) of cyclopropyl cyanide, and about 34 g. (2.00 moles) of anhydrous ammonia was hydrogenated for 16 hrs. at 50° under 1000 p.s.i.g. hydrogen pressure in a rocker-type 300 ml. stainless steel autoclave (the reaction was virtually complete after 1 hr.). The autoclave was then vented to atmospheric pressure, thus allowing the ammonia to escape. The catalyst was filtered off leaving a filtrate of 55 g. (77% yield) of cyclopropylmethylamine.

Example 18

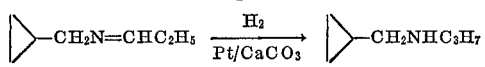

A mixture of 25.5 g. of 90% pure N-propylidine cyclopropylmethylamine (0.207 mole) and 486 mg. of 5% platinum on calcium carbonate was hydrogenated for 4 hrs. at room temperature under 500 p.s.i.g. hydrogen pressure in a rocker-type 300 ml. stainless steel autoclave (the reaction was virtually complete after 45 min.). The catalyst was filtered off and the filtrate was analyzed by glc to contain 21.7 g. (93% yield) of cyclopropylmethyl propyl amine.

What is claimed is:

1. A method for preparing either a cyclopropylmethyl alkyl amine or cyclopropylmethyl alkyl amine optionally substituted with a $C_1$–$C_4$ alkyl group on the cyclopropyl ring, said method comprising the steps of reacting either a cyclopropylmethyl amine or a cyclopropylmethyl amine optionally substituted with a $C_1$–$C_4$ alkyl group on the cyclopropyl ring, with either an aldehyde or ketone or alcohol in the presence of a base to form either an N-alkylidene cyclopropylmethyl amine or an N-alkylidene cyclopropylmethyl amine optionally substituted with a $C_1$–$C_4$ alkyl group on the cyclopropyl ring, said base being one selected from the group consisting of alkali and alkaline earth metal hydroxides; separating the hydroxide layer from an organic layer containing the said N-alkylidene cyclopropylmethyl amine; treating the said N-alkylidene cyclopropylmethyl amine with hydrogen in the presence of a catalyst at a temperature of from about 0° C. to the boiling point of the reaction mixture and a pressure of from about 1 to 300 atmospheres, said catalyst being one selected from the group consisting of rhodium supported on carbon, copper supported on a siliceous support, copper supported on alumina, and platinum supported on calcium carbonate.

2. A method for preparing either cyclopropylmethyl alkyl amines or cyclopropylmethyl alkyl amines optionally substituted with a $C_1$–$C_4$ alkyl group on the cyclopropyl ring, said method comprising the steps of hydrogenating either a cyclopropyl cyanide or a cyclopropyl cyanide optionally substituted with $C_1$–$C_4$ alkyl groups on the cyclopropyl ring in the presence of a metal hydrogenation catalyst at a temperature of from 0° to 100° C. and a pressure of from 1 to 300 atmospheres, reacting said hydrogenated cyanide with an aldehyde or ketone or alcohol in the presence of a base to form either an N-alkylidene cyclopropylmethyl amine or an N-alkylidene cyclopropylmethyl amine optionally substituted with a $C_1$–$C_4$ alkyl group on the cyclopropyl ring, said base being one selected from the group consisting of alkali and alkaline earth metal hydroxides; separating the hydroxide layer from an organic layer containing the said N-alkylidene cyclopropylmethyl amine; treating the said N-alkylidene cyclopropylmethyl amine with hydrogen in the presence of a catalyst selected from the group consisting of rhodium supported on carbon, copper supported on silica, copper supported on alumina and platinum supported on calcium carbonate at a temperature of from about 0° C. to the boiling point of the reaction mixture and at a pressure of from about 1 to 300 atmospheres.

3. The method of Claim 1, wherein the hydrogenation of said cyclopropylcyanide is conducted in the presence of a nickel catalyst.

4. The method of Claim 1, wherein said aldehyde reactant is propionaldehyde.

5. The method of Claim 2, wherein said aldehyde reactant is propionaldehyde.

6. The method of Claim 1, wherein said alcohol reactant is propanol.

References Cited
UNITED STATES PATENTS

| 2,164,587 | 7/1939 | McKee | 260—583 R |
| 2,420,584 | 5/1947 | Brimer et al. | 260—583 C |
| 2,373,705 | 4/1945 | Olin | 260—583 R |
| 2,414,031 | 1/1947 | Emerson | 260—585 C |
| 3,673,251 | 6/1972 | Frampton et al. | 260—583 K |
| 3,739,025 | 6/1973 | Linder et al. | 260—585 B |

FOREIGN PATENTS

| 170,517 | 9/1965 | U.S.S.R. | 260—583 R |

LEWIS GOTTS, Primary Examiner

D. R. PHILLIPS, Assistant Examiner